Oct. 7, 1958 A. H. HENSHALL 2,854,893
EXTERIOR DRIVING REAR VIEW MIRROR FITTING FOR VEHICLES
Filed March 7, 1955 2 Sheets-Sheet 1
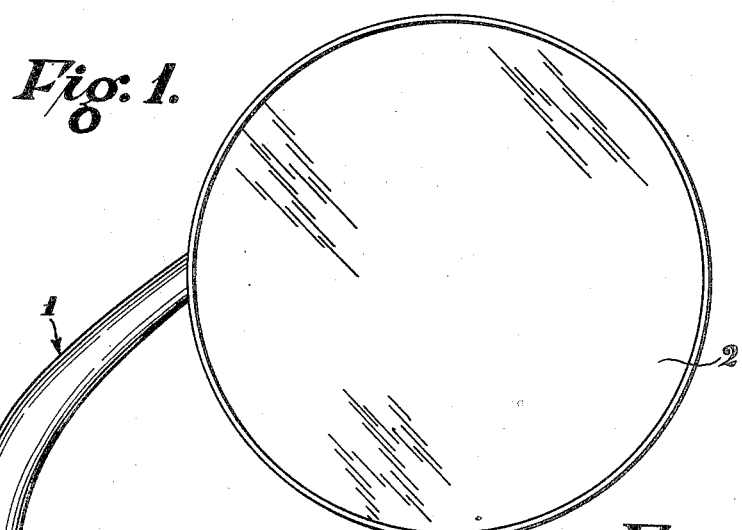
Fig. 1.
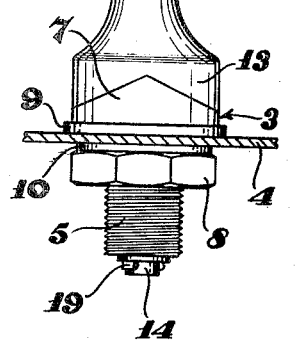
Fig. 2.
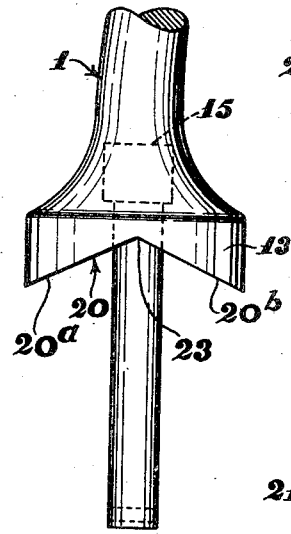
Fig. 3.
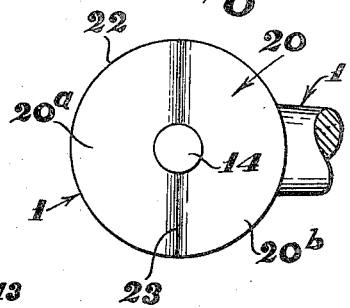
Fig. 5.
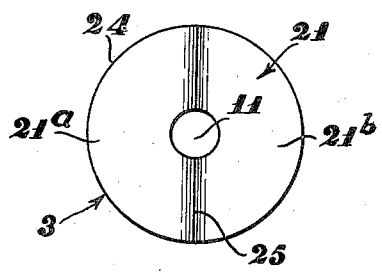
Fig. 4.
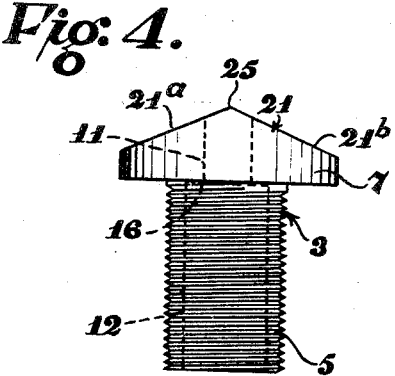
INVENTOR
BY Arthur Howard Henshall

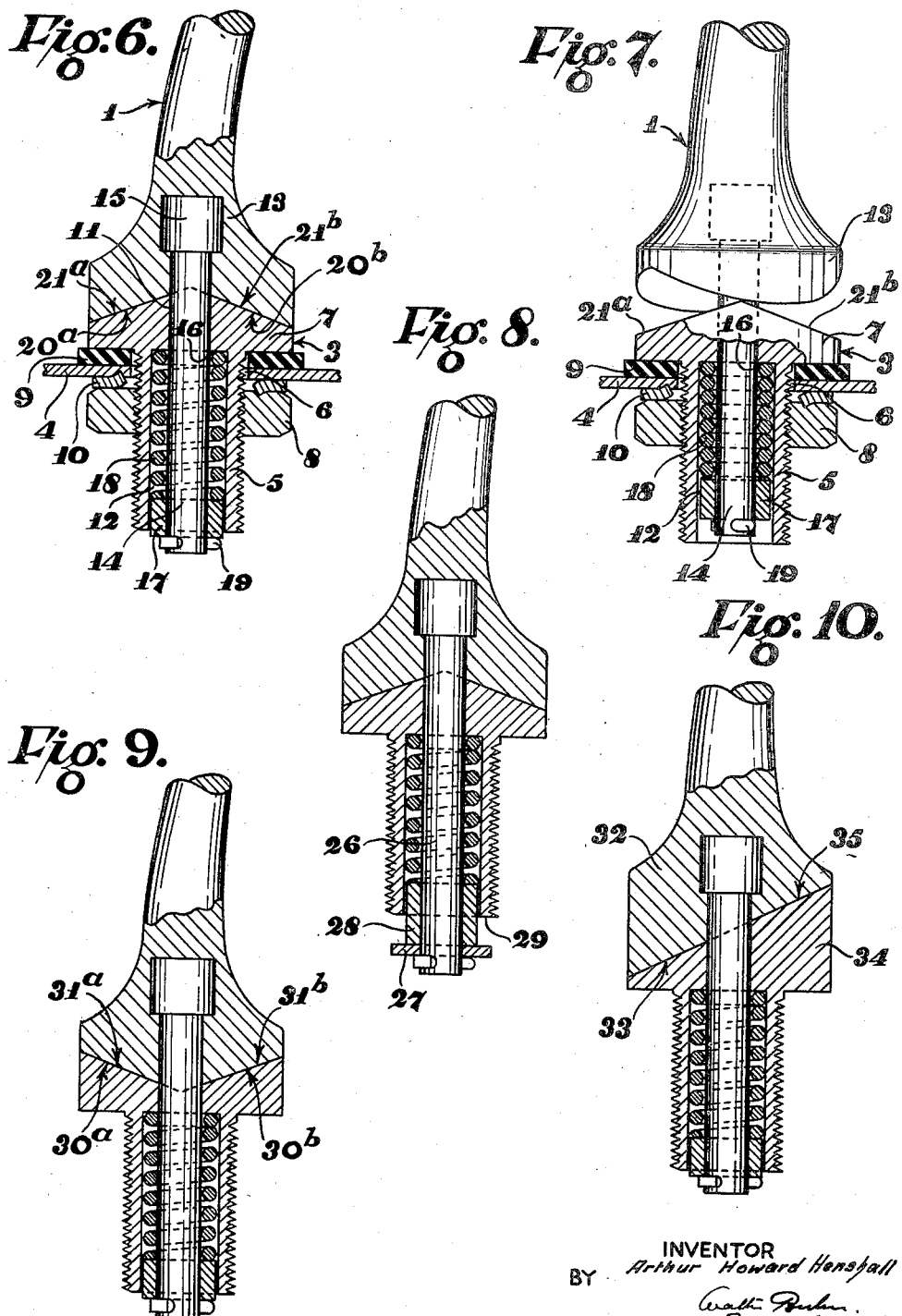

United States Patent Office 2,854,893
Patented Oct. 7, 1958

2,854,893

EXTERIOR DRIVING REAR VIEW MIRROR FITTING FOR VEHICLES

Arthur Howard Henshall, Birmingham, England, assignor to Desmo Limited, Birmingham, England, a British company Application March 7, 1955, Serial No. 492,384

Claims priority, application Great Britain September 7, 1954

9 Claims. (Cl. 88—98)

This invention relates to rear view mirror fittings for vehicles, such fittings being of that kind comprising an arm or bracket carrying a mirror and adapted to be attached to a hood, wing, windshield pillar, or other part of the vehicle so as to project laterally to enable a rear view to be obtained in the mirror.

One object of the invention is to provide a mirror fitting, of the above kind, which is of a novel and improved construction, and which is constructed so that the possibility of the fitting, or the part of the vehicle to which the fitting is attached, being damaged, in the event of the fitting accidentally hitting an object or structure past which the vehicle is being driven, or accidentally receiving a knock or blow, is reduced or obviated.

Another object of the invention is to provide a mirror fitting, of the above kind, which is constructed so that the possibility of the arm or bracket becoming displaced and remaining out of adjustment, in the event of the fitting hitting an object or structure, or receiving a knock or blow, is reduced or obviated.

Figure 1 of the accompanying drawings shows, by way of example, an elevational view of a rear view mirror fitting constructed in accordance with the present invention, the said fitting having a mirror carried by an arm or bracket pivoted at its lower or inner end to an attachment part secured to a part of the vehicle, and the arm or bracket and the mirror being shown in a normal position.

Figure 2 shows on a larger scale than that of Fig. 1 the lower or inner end portion only of the arm or bracket represented in Figure 1, with a pivot pin carried thereby.

Figure 3 is a bottom view of the parts shown in Figure 2.

Figure 4 is on the same scale as Figure 2, and shows only the attachment part represented in Figure 1.

Figure 5 is a plan view of the attachment part shown in Figure 4.

Figure 6 is a vertical section, on the same scale as Figures 2 to 5, through the lower part of the fitting shown in Figure 1.

Figure 7 is a vertical section similar to Figure 6, but showing the arm or bracket turned angularly from the position shown in Figure 6.

Figure 8 represents a modified embodiment of the invention.

Figure 9 shows another modified embodiment of the invention.

Figure 10 shows a further modified embodiment of the invention.

Referring to Figures 1 to 7 of the drawings, a rear view mirror fitting for a vehicle comprises a die-cast arm or bracket 1 carrying a suitable mirror 2 at one end and pivotally connected to an attachment part 3 at the other end, the said attachment part 3 being adapted to be secured to an exterior part, such as 4, of the vehicle so that the fitting can project laterally to enable a rear view to be obtained in the mirror.

The attachment part 3 has a screw-threaded shank portion 5 adapted to pass through a hole 6 (Figure 6) in the part 4 to which the attachment part is to be secured, for example, a hole in a front wing of the vehicle, and a circular head portion in the form of a boss 7 adapted to engage the exterior face of the peripheral surround of the said hole, the said boss 7 being arranged to be drawn against the said surround by a nut 8 engaging the threaded shank 5 of the attachment part, so as to hold the latter firmly in position. Conveniently, a rubber washer 9 is interposed between the boss 7 and the exterior face of the aforesaid surround of the hole, whilst a shake-proof washer 10 can be interposed between the other face of the surround and the nut 8. The attachment part is provided with an axial through bore having a smaller-diameter inner portion 11 in the boss 7 of the attachment part, and a larger-diameter outer portion 12 in the shank 5 of the said part.

The end of the arm or bracket 1 which is pivoted to the attachment part 3 is formed as a circular-sectioned boss 13 integral with the main outer part of the arm, which is curved laterally away from the axis of the said boss 13, and this boss is connected to the attachment part by a pivot pin 14. The said pivot pin 14 forms an axial extension of the boss 13 and has an inner head or terminal portion 15 which is embedded in the boss during the die-casting of the arm, so as to fix the pin 14 in place, whilst the main portion of the said pivot pin 14 passes through the axial bore in the attachment part 3, being rotatably received by the smaller-diameter inner portion 11 of the said bore, and being spaced from the wall of the larger-diameter outer portion 12 of the bore by an annular space or clearance. Disposed in this annular space or clearance, and bearing at one end on the shoulder (shown at 16) between the two different-diameter portions 11, 12, of the bore, and at the other end on a collar 17 carried by the outer end of the pivot pin 14, is a coiled compression spring 18 which is co-axial with, and which surrounds, the said pin 14. The collar 17 is suitably retained on the pin 14, such as by a split cotter pin 19 engaging the outer face of the collar, or by other suitable means. The boss 13 and pivot pin 14 are arranged to be axially displaceable away from the boss 7 of the attachment part, the collar 17 on the pin moving in the larger-diameter portion 12 of the bore, and compressing the spring 18, when such displacement occurs.

The circular pivot-carrying boss 13 at the end of the arm or bracket 1 has a re-entrant end face 20 which is presented towards an end face 21 of the boss 7 of the attachment part. This face 20 of the boss 13 is bounded by a circular outer periphery 22 (Figure 3) which is concentric with the axis of the pivot pin 14 and the said face 20 consists of two segmental, plane half-faces 20ᵃ, 20ᵇ, which are symmetrically disposed obliquely to the said pivoted axis. The entire outer periphery of each half-face, 20ᵃ, or 20ᵇ, coincides with the outer periphery 22 of the boss 13, and the inner peripheries of the said half-faces meet along a diameter 23 of the face. The end face 21 of the attachment part boss 7, towards which the re-entrant boss face 20 is presented, is formed as a counter-part to the said re-entrant face 20, and projects from the attachment part 7. This counter-part face 21 of the boss 7 is bounded by a circular outer periphery 24 (Figure 5) concentric with the axis of the attachment part boss 7 and consists of two segmental, plane, half-faces 21ᵃ, 21ᵇ which are symmetrically disposed obliquely in relation to the axis of the boss 7, the entire outer periphery of each half-face, 21ᵃ or 21ᵇ, coinciding with the outer periphery 24 of the boss 7, and the inner peripheries of the said half-faces meeting to form a ridge 25 along a diameter of the face 21.

The arrangement is such that, when the arm or bracket 1 is in the pre-determined normal angular position shown in Figures 1 and 6 the re-entrant end face 20 of the boss 13 fully engages the counter-part ridged end face 21 of the boss 7, the compression spring 18 acting to keep the faces 20, 21, pressed together, and the ridged part 25 of the face 21 of the boss 7 registering with the meeting portions of the oblique half-faces 20ᵃ, 20ᵇ, of the boss 13. When, however, the arm or bracket 1 receives a knock or blow from either side, or is otherwise caused to turn from its normal position, the boss 13 and pivot pin 14 are caused to rotate so that the oblique half-faces 20ᵃ, 20ᵇ of the boss 13 move relatively to the corresponding opposed half-faces 21ᵃ, 21ᵇ, of the attachment part boss 7, thereby causing the boss 13 and pin 14 to be axially displaced away from the said boss 7, so that the collar 17 retained on the pin 14 moves in the larger-diameter portion 12 of the bore of the attachment part and compresses the spring 18. The improved mirror fitting thus yields against spring pressure to an impact or blow from either of two opposite directions, thereby reducing the danger of the arm or bracket, or the mirror, being accidently damaged, and also reducing the possibility of an accidental impact or blow on the fitting exerting leverage through the arm or bracket to cause buckling of the vehicle wing or other part to which the fitting is attached, or to cause the fitting to be prised away from the said wing or other part.

The spacing of the coils of the spring 18 may be chosen so that the spring reaches full compression, with adjacent coils abutting against each other, as shown in Figure 7, before the arm or bracket 1 has been turned sufficiently to cause the boss 13 to over-ride the boss 7 into a position in which the spring could not act to return the arm or bracket to its normal position. The spring 18 then when fully compressed, serves as a stop to prevent such over-riding of the boss 7 by the boss 13.

Or, if preferred, the coils of the spring 18 may be more widely spaced, so as to allow the boss 13 to over-ride the boss 7 in the event of the impact received by the fitting being sufficiently severe, with a view to further reducing the possibility of the fitting, or the part to which the fitting is attached, being damaged by an impact.

The symmetrical arrangement of the oblique half-faces of the boss 13 and of the boss 7 ensures that side-thrust on the pivot pin 14 is minimised when the arm or bracket is turned.

Figure 7 of the drawings shows a modification in which separate stop means for preventing the boss on the arm or bracket from over-riding the boss on the attachment part are provided. In the arrangement shown in Figure 8 a pin 26 pivotally connecting the arm to the attachment part carries at its lower end a washer 27 bearing on a collar 28 engaging the spring, the said washer 27 constituting a stop member preventing over-riding and being adapted, when the arm is moved against the action of the spring, to co-operate with an abutment face 29 on the lower end of the shank of the attachment part. If desired, the washer 27 may be formed integral with the collar 28.

Figure 9 represents a modification in which the arrangement of the opposed relatively-movable faces shown in the previous figures is reversed. In Figure 9, the boss on the arm or bracket has a ridged circular end face instead of a re-entrant circular end face, and the boss on the attachment part has a re-entrant circular end face, instead of a ridged circular end face. The ridged face on the boss on the arm consists of two oblique, symmetrically disposed segmental half-faces 30ᵃ, 30ᵇ, which are downwardly presented and which have their entire outer peripheries coinciding with the outer periphery of the boss on the arm, and which have their inner peripheries meeting along a diameter of the boss to form a ridge. The re-entrant face on the boss on the attachment part consists of two oblique, symmetrically-disposed, segmental half-faces 31ᵃ, 31ᵇ, which are upwardly presented and which have their entire outer peripheries coinciding with the outer periphery of the boss on the attachment part, and which have their inner peripheries meeting along a diameter of the boss. When the arm is turned the half-faces 30ᵃ, 30ᵇ, move relatively to the half-faces 31ᵃ, 31ᵇ, to cause the arm and its pivot pin to be axially displaced against the action of the spring.

Figure 10 shows a modification in which the arm or bracket has a pivot-carrying circular boss 32 provided with a single, downwardly-presented circular oblique face 33 having its entire outer periphery coinciding with the circular outer periphery of the boss 32. The attachment part here has a head in the form of a circular boss 34 provided with a single, upwardly-presented circular oblique face 35 having its entire outer periphery coinciding with the circular outer periphery of the boss 34. The oblique face 35 forms a counter-part to the oblique face 33, the said face 33 moving, when the arm is turned, relatively to the face 35, so as to cause the arm and its pivot pin to be axially displaced against the action of the spring.

A protective cap or cover (not shown) of rubber or other suitable material may be fitted over the outer or lower end of the shank portion of the attachment part, the said cap or cover serving, when, for example, the attachment part is secured to a vehicle wing, to protect the mechanism against ingress of dust, mud, or water.

The arm or bracket may be produced in any suitable manner, instead of being die-cast, and the pivot pin may be arranged in any other suitable way. For example, the said pin may have a screw-threaded inner end engaged with a tapped hole in the boss, instead of the pin having a head which is embedded in the boss during a die-casting operation.

The arm or bracket may be of any other suitable form and its main outer portion may, for example, project radially from the side of the boss, if desired, so as to be at right angles to the pivotal axis of the said boss, instead of being curved away from the said axis.

The attachment part also may be of any other suitable form, and instead of having a shank adapted to be engaged with a hole in a wing or other part of the vehicle, the attachment part may be provided with an attachment flange, such as a base flange or side flange, adapted to be secured against the part of the vehicle to which the fitting is to be attached.

I claim:

1. A rear view mirror fitting for a vehicle, said fitting comprising a mirror; an attachment part; an arm carrying the mirror; a journal bearing between said arm and attachment part and swivelly interconnecting said arm and attachment part, said arm being displaceable in said journal bearing in the direction of its axis of rotation; spring means disposed so as to act against said axial displacement of said arm; a boss on said arm, said boss being coaxial with the axis of rotation of the arm; a pair of surfaces on said boss at one end thereof, said surfaces being symmetrically disposed obliquely to the axis of rotation of said arm and meeting on a diameter while extending therefrom to a boundary concentric with said axis; a pair of symmetrically-disposed surfaces on the attachment part, said last-mentioned surfaces when in normal position being disposed opposite, and in contact over a substantial area with the aforesaid oblique surfaces on the boss on the arm and the oblique surfaces on said boss being adapted to move relatively to said surfaces on the attachment part under an impact on the arm and also under an impact on the mirror sufficient to cause the arm to move angularly, said relative angular movement between the said surfaces being possible up to a right angle in each direction from said normal position against the action of the spring means, in the direction of the axis of rotation of the arm, thereby affording said spring means a restoring torque to return the arm to said normal position.

2. A rear view mirror fitting for a vehicle, said fitting comprising a mirror; an attachment part; an arm carrying the mirror and swivelly connected to said attachment part, said arm being displaceable in the direction of its axis of rotation; spring means disposed so as to act against said axial displacement of said arm; a boss on the attachment part, said boss being co-axial with the axis of rotation of the arm; a pair of surfaces on said boss at one end thereof, said surfaces being symmetrically disposed obliquely to the axis of rotation of said arm, and each extending radially outwards from a diametrical axis at which said surfaces meet to a semicircular periphery; a pair of symmetrically-disposed surfaces on the arm, said last-mentioned surfaces being disposed opposite the aforesaid oblique surfaces on the boss on the attachment part and being adapted to move relatively to said oblique surfaces on the boss on the attachment part under an impact on the arm and also under an impact on the mirror to cause the arm to move angularly from a position in which the opposed surfaces are in contact over a substantial area, said relative movement between the said surfaces by continuous contact one with the other throughout such angular movement at diametrically opposed points on their periphery being arranged to cause the arm to move against the action of the spring means in the direction of the axis of rotation of the arm.

3. A rear view mirror fitting for a vehicle comprising in combination: a mirror; an attachment part; an arm carrying the mirror and swivelly connected to the attachment part, said arm being displaceable in the direction of its axis of rotation; spring means disposed so as to act against said axial displacement of the arm; a boss on said arm, said boss being co-axial with the axis of rotation of the arm; a pair of surfaces on said boss at one end thereof, said surfaces being symmetrically disposed obliquely to the axis of rotation of said arm, and each extending radially outwards from a diameter at which said surfaces meet to a semi-circular periphery; a boss on the attachment part, said boss on the attachment part being co-axial with the axis of rotation of the arm; a pair of surfaces on said boss on the attachment part, said last-mentioned surfaces being symmetrically disposed obliquely to the axis of rotation of said arm and each extending radially outwards from a diameter at which said last-mentioned surfaces meet to a semi-circular periphery, said oblique surfaces on the boss on the attachment part being disposed opposite to the oblique surfaces on the boss on the arm and the oblique surfaces on the boss on the arm being adapted to move relatively to the oblique surfaces on the boss on the attachment part under an impact on the arm and also under an impact on the mirror sufficient to cause the arm to move angularly from a position in which the opposed surfaces are in contact over a substantial area, said relative movement between the said oblique surfaces by continuous contact one with the other throughout such angular movement at diametically opposed points on their periphery being arranged to cause the arm to move against the action of the spring means in the direction of the axis of rotation of the arm.

4. A rear view mirror fitting for a vehicle comprising in combination: a mirror; an attachment part; an arm carrying the mirror and swivelly connected to the attachment part, said arm being displaceable in the direction of its axis of rotation; spring means disposed so as to act against said axial displacement of the arm; a boss on said arm, said boss being co-axial with the axis of rotation of the arm; a circular re-entrant end face on the boss, said re-entrant end face consisting of two segmental plane oblique half-faces symmetrically disposed relatively to the axis of rotation of the arm, said half-faces meeting along a diameter of the said circular re-entrant end face; a boss on the attachment part, said boss on the attachment part being co-axial with the axis of rotation of the arm; a circular projecting end face on said boss on the attachment part, said projecting end face forming a counterpart to the aforesaid re-entrant end face and consisting of two segmental plane oblique half-faces symmetrically disposed relatively to the axis of rotation of the arm, said half-faces constituting the circular projecting end face and meeting along a diameter of said circular projecting end face to form a ridge, the re-entrant end face on the boss on the arm being adapted to move relatively to the projecting end face on the boss on the attachment part under an impact on the arm and also under an impact on the mirror sufficient to cause the arm to move angularly from a position in which the projecting and re-entrant end faces are fully in engagement, said relative movement between the said end faces being arranged by continuous contact between the said end faces at diametrically opposed points throughout such relative angular movement to cause the arm to move in the direction of the axis of rotation of the arm and against the action of the spring means through substantially a right angle displacement in each direction from said position.

5. A rear view mirror fitting for a vehicle, said fitting comprising a mirror; an attachment part; an arm carrying the mirror and swivelly connected to the attachment part, said arm being displaceable in the direction of its axis of rotation; spring means disposed so as to act against said axial displacement of the arm; a boss on said arm, said boss being co-axial with the axis of rotation of the arm; a circular projecting end face on the boss, said projecting end face consisting of two segmental, plane, oblique half-faces symmetrically disposed relatively to the axis of rotation of the arm, said half-faces having their entire outer peripheries coinciding with the outer periphery of the boss and having their inner peripheries meeting along a diameter of the said circular projecting end face to form a ridge; a boss on the attachment part, said boss on the attachment part being co-axial with the axis of rotation of the arm; a circular re-entrant end face on said boss on the attachment part, said re-entrant end face forming a counter-part to the aforesaid projecting end face and consisting of two segmental, plane, oblique half-faces symmetrically disposed relatively to the axis of rotation of the arm, said half-faces constituting the circular re-entrant end face having their entire outer peripheries coinciding with the outer periphery of the boss on the attachment part and having their inner peripheries meeting along a diameter of said circular re-entrant end face, the projecting end face on the boss on the arm being adapted to move relatively to the re-entrant end face on the boss on the attachment part under an impact on the arm and also under an impact on the mirror sufficient to cause the arm to move angularly, said relative movement between the said end faces being arranged to cause the arm to move, against the action of the spring means, in the direction of the axis of rotation of the arm.

6. A rear view mirror fitting for a vehicle, said fitting comprising a mirror; an attachment part having a bore therein, an arm carrying said mirror; an axially-displaceable pin carried by said arm and swivelly connecting said arm to said attachment part, said pin being received by said bore in journal bearing engagement; an abutment on said pin; a compression spring housed in said bore so as to surround the pin, said spring bearing against said abutment so as to act against axial displacement of the pin; a boss on said arm, said boss being co-axial with the axis of rotation of the arm; a pair of surfaces on said boss at one end thereof, said surfaces being symmetrically disposed obliquely to the axis of rotation of the arm but making an obtuse dihedral angle with one another at a diameter at which they meet, the entire outer periphery of each of the said surfaces coinciding with the outer periphery of the boss; a boss on the attachment part, said boss on the attachment part being co-axial with the axis of rotation of the arm; a pair of surfaces on said boss on the attachment part, said last-mentioned surfaces being symmetrically disposed obliquely to the axis of rotation of said arm and the entire outer periphery of each of said last-mentioned surfaces coinciding with the outer periphery of said last-mentioned boss, said oblique surfaces on the boss on the attachment part being disposed opposite to the oblique surfaces on the boss on the arm and remaining in contact therewith at least at diametrically opposed points throughout relative angular movement between said opposed oblique surfaces and the oblique surfaces on the boss on the arm being adapted to move relatively to the oblique surfaces on the boss on the attachment part under an impact on the arm and also under an impact on the mirror sufficient to cause the arm to move angularly from an initial position, said relative movement between the said oblique surfaces being arranged to cause the pin and the arm to move, against the action of the spring, in the direction of the axis of rotation of the said arm and pin and to provide a torque for restoring the arm to the initial position upon angular displacement of up to a right angle in either direction from said initial position.

7. A rear view mirror fitting for a vehicle, said fitting comprising a mirror; an attachment part; an arm carrying the mirror and swivelly connected to the attachment part, said arm being displaceable in the direction of its axis of rotation; a compression spring disposed so as to act against said axial displacement of said arm; a pair of surfaces on said arm, said surfaces being symmetrically disposed obliquely to the axis of rotation of the arm; a pair of symmetrically-disposed oblique surfaces on the attachment part, said last-mentioned surfaces being disposed opposite the aforesaid oblique surfaces on the arm, and the oblique surfaces on the arm being adapted to move relatively to the oblique surfaces on the attachment part under an impact on the arm and also under an impact on the mirror sufficient to cause the arm to move angularly, said relative movement between the said surfaces being arranged to cause the arm to move, against the action of the compression spring, in the direction of the axis of rotation of the arm, the said spring, when fully compressed, serving as a stop to prevent the oblique surfaces on the arm from over-riding the oblique surfaces on the attachment part.

8. A rear view mirror fitting for a vehicle, said fitting comprising a mirror; an attachment part; an arm carrying said mirror; an axially-displaceable pin carried by said arm and swivelly connecting said arm to said attachment part; a stop member carried by said pin; a compression spring disposed so as to act against said axial displacement of said pin; an abutment face on said attachment part; a pair of surfaces on the arm, said surfaces being symmetrically disposed obliquely to the axis of rotation of the arm; a pair of symmetrically-disposed oblique surfaces on the attachment part, said last-mentioned surfaces being disposed opposite the aforesaid oblique surfaces on the arm, and the oblique surfaces on the arm being adapted to move relatively to the oblique surfaces on the attachment part under an impact on the arm and also under an impact on the mirror sufficient to cause the arm to move angularly, said relative movement between the said oblique surfaces being arranged to cause the arm and pin to move, against the action of the compression spring, in the direction of the axis of rotation of the arm and pin, the aforesaid stop member carried by the pin being arranged to co-operate with the aforesaid abutment face on the attachment part to limit the axial displacement of the pin and arm, so as to prevent the oblique surfaces on the arm from over-riding the oblique surfaces on the attachment part.

9. A rear view mirror fitting for a vehicle comprising a mirror, an attachment part, an arm carrying the mirror and swivelly mounted in journal bearing engagement with said attachment part, a boss on the arm adjacent the attachment part, and a spring urging the boss against said attachment part, adjacent surfaces of said boss and attachment part forming cam surfaces which in a normal angular position are in contact over a substantial area and each comprising two faces symmetrically inclined to the axis of said boss and attachment part, the cam surfaces on relative angular movement between the arm and attachment part causing axial movement of the arm with respect to said attachment part to compress said spring and afford a restoring force for turning said arm back to its normal position for angular displacement of up to a right angle in each direction from the normal position.

References Cited in the file of this patent
UNITED STATES PATENTS

| | | |
|---|---|---|
| 1,313,616 | Walsh | Aug. 19, 1919 |
| 1,681,026 | Bradnack | Aug. 14, 1928 |
| 1,921,310 | Crisman | Aug. 8, 1933 |
| 1,932,697 | Jankovic | Oct. 31, 1933 |
| 2,424,222 | Brown et al. | July 22, 1947 |
| 2,533,475 | Koonter | Dec. 12, 1950 |
| 2,565,012 | Barrett | Aug. 21, 1951 |
| 2,724,996 | O'Shei | Nov. 29, 1955 |